United States Patent

[11] 3,580,501

| [72] | Inventor | Donovan P. Streed<br>Rte. 2, Shakopee, Minn. 55379 |
|---|---|---|
| [21] | Appl. No. | 810,309 |
| [22] | Filed | Mar. 25, 1969 |
| [45] | Patented | May 25, 1971 |

[54] HUMIDITY AND TEMPERATURE SENSING AND CONTROL CIRCUIT
6 Claims, 1 Drawing Fig.

[52] U.S. Cl. ..................................................... 236/44, 236/91
[51] Int. Cl. ..................................................... G05d 22/02
[50] Field of Search ............................................. 236/44, 99

[56] References Cited
UNITED STATES PATENTS

| 2,214,700 | 9/1940 | Newton | 236/91X |
| 2,217,680 | 10/1940 | Haines | 236/91X |
| 2,290,426 | 7/1942 | Haines | 236/44X |
| 2,991,653 | 7/1961 | Thompson | 236/44UX |
| 3,118,601 | 1/1964 | Robb | 236/44E |
| 3,343,791 | 9/1967 | White | 236/91X |

Primary Examiner—Edward J. Michael
Attorney—James R. Cwayna

ABSTRACT: An electronic relative humidity sensing and control circuit having outdoor temperature reset is described. A circuit having temperature and humidity sensors arranged in a bridge circuit for providing control signals to a transistor amplifier is shown for controlling humidity-determining equipment. Additional bridge circuitry is also shown for automatically sensing an controlling heating and air conditioning equipment in response to sensed changes in outdoor temperature.

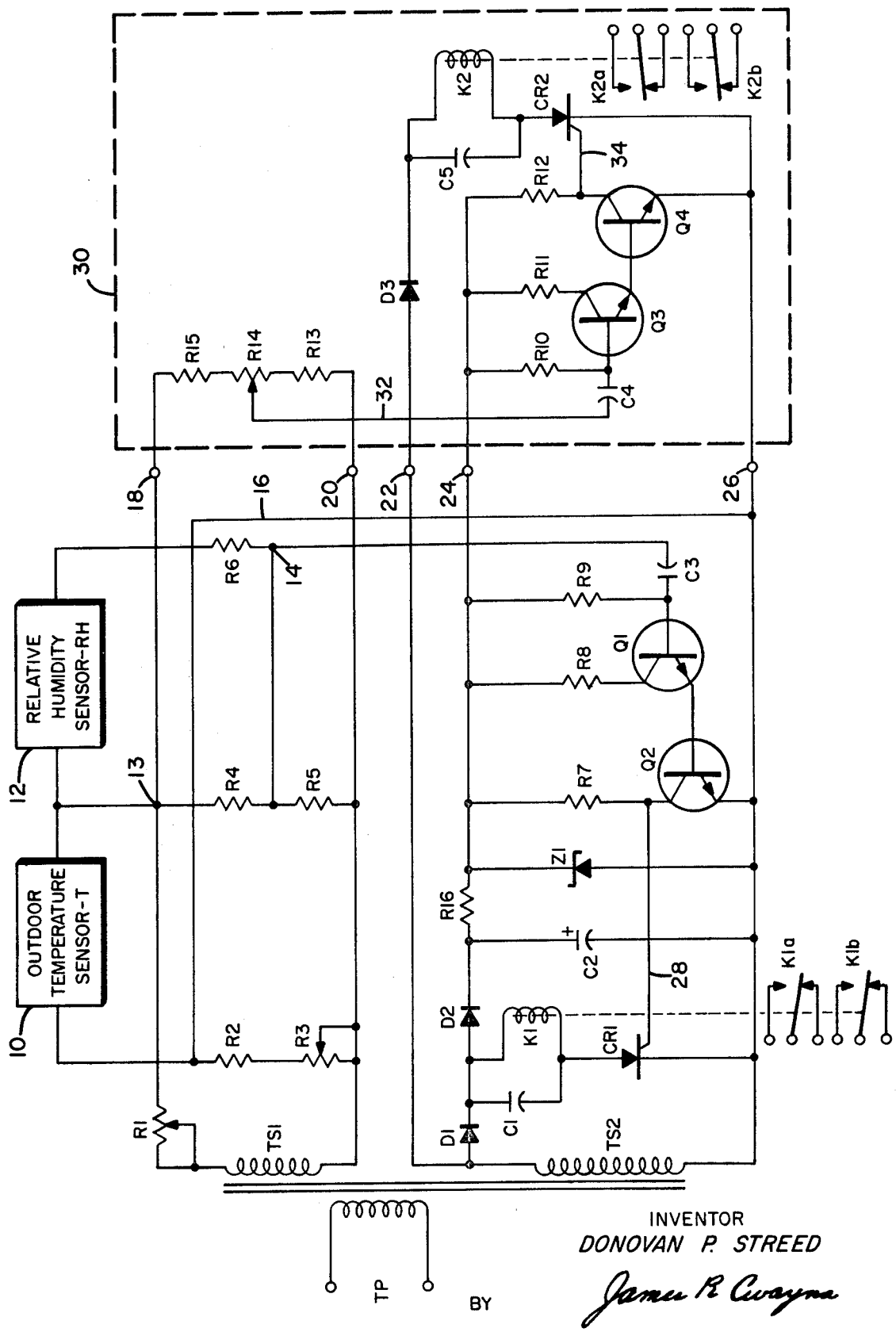

HUMIDITY AND TEMPERATURE SENSING AND CONTROL CIRCUIT

BACKGROUND OF THE INVENTION

1. Field Of The Invention

This invention relates generally to the field of condition responsive apparatus. More particularly, this invention relates to circuitry for sensing changes in relative humidity and outdoor temperature for automatically controlling humidity and temperature determining equipment.

2. Description Of The Prior Art

Humidity sensors and temperature sensors are well-known in the prior art. It is also well-known in the prior art to associate these sensors with humidification-determining equipment and temperature-determining equipment. These known prior art devices require the manual intervention of an operator to make appropriate humidity or temperature settings and selections after having observed outdoor temperature from some other means. This necessitates continued observation to preclude the humidity becoming too high or too low, or the temperature indoors becoming too high before it is determined that air conditioning equipment should be activated. There is no known relative humidity sensing and control circuitry and temperature sensing and control circuitry of the type defined herein, for automatically comparing the sensed outdoor temperature to the indoor sensed relative humidity for electronically controlling the operation of humidification and dehumidification equipment without the manual intervention required in the prior art. Further, there is no showing in the prior art of a combination system wherein relative humidity is controlled over a predetermined range of indoor and outdoor temperatures with the humidity control being phased out as the outdoor temperature exceeds a certain predetermined level. Additionally, there is no showing in the prior art of automatically combining an air conditioning control sensing and control circuit for phasing in air conditioning control when the outdoor temperature reaches the phase out level for the relative humidity control.

SUMMARY

Briefly, this invention includes an alternating current powered control system for powering a bridge circuit having an indoor relative humidity sensor in one leg balanced against an outdoor temperature sensor in another leg, with the bridge null being adjustable to obtain different values of percentage of indoor relative humidity depending upon the outdoor temperature. Further, the bridge is designed in a manner such that above a predetermined outdoor temperature the control action of the relative humidity sensor phases out. So that a complete range of control may be obtained, additional circuitry is added to the bridge and is operative for controlling air conditioning equipment above a predetermined temperature level. A pair of two-stage amplifiers is used to respond to the error signals derived from the two bridge arrangements each for controlling a gate circuit that is associated respectively with relay controls for controlling the operation of humidification equipment and air conditioning equipment.

A primary objective of this invention, then, is to provide an improved electronic humidity control apparatus. Yet another object of this invention is to provide an improved bridge circuit arrangement having condition responsive apparatus in different legs thereof for providing an improved control signal. Yet another object of this invention is to provide an improved bridge circuit having condition responsive apparatus in different legs thereof, wherein said condition responsive apparatus includes outdoor temperature sensing means and relative humidity sensing means, for providing control signals indicative of changes in predetermined percentages of relative humidity at predetermined outdoor temperature levels. Still a further object of this invention is to provide humidity control means having a bridge circuit with outdoor temperature sensing means and indoor relative humidity sensing means in opposing legs, with amplifier means for amplifying error signals for controlling humidification-determining apparatus. Still a further object of this invention is to provide control circuitry for controlling indoor relative humidity in a predetermined range of outdoor temperatures, and controlling air conditioning equipment in a second range of outdoor temperatures.

These and other more detailed objectives will become apparent when the following description of the preferred embodiment is considered in light of the drawing.

BRIEF DESCRIPTION OF THE DRAWING

The FIGURE is a circuit schematic of the relative humidity and temperature sensing and control circuit of this invention.

DESCRIPTION OF THE PREFERRED EMBODIMENT

The FIGURE is a circuit schematic diagram of a preferred embodiment of this invention. A transformer comprised of a primary winding TP, and a pair of secondary windings TS1 and TS2, is used for powering the circuit. A power source (not shown) capable of providing alternating current at 60 cycles per second, at a nominal voltage of 120 volts, is coupled to the primary TP. Secondary winding TS1 has sufficient turns to provide a 6.3 volt alternating current supply to the circuit in which it is connected. One side of the secondary winding TS1 is coupled to variable resistor R1, which operates as a sensitivity control.

An outdoor temperature sensor T, labeled 10, is coupled at one terminal to a relative humidity sensor RH, labeled 12, and this coupling is connected in turn to a common terminal 13. The other terminal of the outdoor temperature sensor 10 is coupled to resistor R2, which in turn is coupled to variable resistor R3. The other terminal of variable resistor R3 is coupled to the second terminal of the secondary winding TS1. The common terminal 13 is coupled to resistor R4 which in turn is coupled to resistor R5 with the other terminal resistor R5 coupled to the common line to the terminal of secondary winding TS1. The other terminal of the relative humidity sensor 12 is coupled to resistor R6, which in turn is coupled to a common terminal 14. The common terminal 14 is coupled to the junction of resistors R4 and R5. The junction of the resistor R2 and the outdoor temperature sensor 10 is coupled to lead 16.

The circuitry thus far described comprises a transformer powered bridge circuit with one side of the bridge comprised of the outdoor temperature sensor 10 and the resistors R2 and R3, and the other side of the bridge is comprised of the relative humidity sensor 12 and the resistor network comprised of resistors R4, R5, and R6. The bridge error signal is derived at common terminal 14 and is utilized to drive the amplifier circuits described below. Terminals 18 and 20 are available for coupling to additional sensing and control circuitry that will be described below.

The control portion of the circuitry is powered by transformer secondary winding TS2, with one terminal of the transformer winding coupled to terminal 22, and to diode D1. The other terminal of diode D1 is coupled to diode D2, to one terminal of capacitor C1, and to one terminal of relay coil K1. Relay coil K1 is utilized for controlling humidity equipment (now shown) such as humidifying equipment and dehumidifying equipment by way of contacts K1a and K1b. The capacitor C1 has its other terminal coupled to the second terminal of relay coil K1 and operates to filter the pulsating DC that appears across relay coil K1 for minimizing chatter of the relay contacts. The other terminal of diode D2 is coupled to the positive terminal of capacitor C2 and one terminal of resistor R16. The second terminal of resistor R16 is coupled to Zener diode Z1, to one terminal each of resistors R7, R8, and R9 and to circuit terminal 24. The other terminal of transformer secondary winding TS2 is the common lead and is coupled to conductor 16 and terminal 26. The other terminals of capacitor C2 and Zener diode Z1 are coupled to the common line. The function of Zener diode Z1 is to regulate the voltage at the terminal of resistor R16. For this embodiment, the regulated DC voltage at this point is approximately 10 volts. The function of capacitor C2 is to filter the rectified voltage appearing at the junction of diode D2 and resistor R16.

A pair of transistors Q1 and Q2 are utilized as the amplifiers in the control circuit portion. By way of capacitor C3 the error signal appearing at common point 14 in the bridge circuit will be directed to the base electrode of transistor Q1. Resistor R9 provides base bias to the base circuit of transistor Q1. The collector terminal of transistor Q1 is coupled to resistor R8, which operates as a load resistor for the amplifier circuit. The emitter terminal of transistor Q1 is coupled directly to the base terminal of transistor Q2. The emitter terminal of transistor Q2 is coupled to the common line. The collector of transistor Q2 is coupled to resistor R7, which functions as a load for the circuit and also to conductor 28.

A silicon controlled rectifier CR1 has one terminal coupled to the common point of capacitor C1 and relay coil K1 and its other terminal coupled to the common line. The gating terminal of the silicon controlled rectifier CR1 is coupled to the conductor 28.

Under normal conditions, transistors Q1 and Q2 are normally in the conductive or "on" condition thereby providing a control signal on conductor 28 that will cause the silicon controlled rectifier CR1 to be controlled such that no current flows therethrough thereby preventing relay coil K1 from operating. An error signal appearing at circuit terminal point 14 will cause transistors Q1 and Q2 to switch to the nonconductive state, or "off," on alternate half cycles, thereby providing a gating signal on conductor 28 that will condition silicon controlled rectifier CR1 to conduct. Conduction of the silicon controlled rectifier will cause the relay coil K1 to be operative thereby actuating its associated contacts. An error signal of the opposite polarity will cause silicon controlled rectifier CR1 to be cut out since its anode would be negative by operation of diode D2 at the time the gate signal applied to conductor 28 would go positive, thereby causing relay K1 to be deactivated.

The circuitry described thus far relates to the electronic system for sensing the relative humidity indoors and comparing it to a sensed temperature outdoors, and the amplifier circuit arrangement for responding to a bridge error signal for controlling the operation of humidification or dehumidification apparatus.

The circuitry shown enclosed in dashed block 30 can be added to the circuitry previously described for controlling an air conditioning changeover. In this arrangement, the circuitry is coupled to the power terminals 18, 20, 22, 24 and 26 previously described. In this arrangement, the resistors R13, R14 and R15 are connected in series across terminals 18 and 20 thereby forming an auxiliary portion of the bridge previously described. Their operation is such that it is bucked against the outdoor temperature sensor 10. The error signal is derived from the tap of variable resistor R14 and is taken on conductor 32 as the input control signal through capacitor C4 to the base of transistor Q3. In this arrangement, a bridge null can be adjusted in the 55° to 75° outdoor temperature range with the selection being made by the adjustment of resistor R14. The amplifier and relay portion is similar to that described with regard to the humidity control portion. The amplifier is comprised of transistors Q3 and Q4. The base bias resistor R10 and the collector load resistor R11 for transistor Q3 are coupled to terminal 24. The emitter of transistor Q3 is coupled to the base of transistor Q4. The emitter of transistor Q4 is coupled to the common line and terminal 26. The collector electrode of transistor Q4 is coupled to the load resistor R12 and to signal line 34. Diode D3 couples terminal 22 to the common point of capacitor C5 and relay coil K2. The second terminals of capacitor C5 and relay K2 are coupled in common to the anode of silicon controlled rectifier CR2. A second terminal of silicon controlled rectifier CR2 is coupled to the common line, the control electrode is coupled to conductor 34. The contacts K2a and K2b can be utilized for controlling the air conditioning equipment, (not shown) and can further be used to deactivate the operation of relay K1 contacts when the outdoor temperature reaches the preset value such that the air conditioning equipment will be utilized.

A characteristic set of component values that has been found advantageous is set forth in Table 1 below:

TABLE I

| | | |
|---|---|---|
| C1, C2, C4 | 100μf | |
| C3, C5 | .47μf | |
| CR1, CR2 | silicon controlled rectifier C106A | |
| D1, D2, D3 | Diode–1N645 | |
| K1, K2 | Relays | |
| Q1, Q2, Q3, Q4 | NPN Transistors–2N2924 | |
| R1 | Resistor, Variable–50K ohms | |
| R2 | Resistor, 2K±5% ohms | |
| R3 | Resistor, Variable— 1K ohms | |
| R4 | Resistor–200K±5% ohms | |
| R5 | Resistor–2.4K±5% ohms | |
| R6 | Resistor, 12K±5% ohms | |
| R7 | Resistor, 10K ohms | |
| R8 | Resistor, 100K ohms | |
| R9 | Resistor, 1Meg. ohms | |
| R10 | Resistor, 1Meg. ohms | |
| R11 | Resistor, 100K ohms | |
| R12 | Resistor, 10K ohms | |
| R13 | Resistor, 1.8K±5% ohms | |
| R14 | Resistor, Variable–3K ohms | |
| R15 | Resistor, 9.1K±5% ohms | |
| R16 | Resistor, 1K ohms | |
| RH | Relative Humidity Sensor–Q 229A1031 | |
| TP | Transformer, Primary | |
| TS1 | Transformer, Secondary 1 | |
| TS2 | Transformer, Secondary 2 | |
| T | Temperature Sensor | |
| Z1 | Zener Diode | |

OPERATION

Having described the circuit arrangement of this invention in detail, the circuit operation, together with the various adjustable range selections, will be made.

The heart of the entire sensing and control system is the alternating current powered bridge having the relative humidity sensor 12 in one leg and the outdoor temperature sensor 10 in another leg together with the resistance values described above. In this arrangement, it is possible to obtain bridge null at different values of the indoor percentage of relative humidity depending upon the sensed outdoor temperature. In this regard, variable resistor R1 is a bridge sensitivity control and variable resistor R3 is a calibration for setting the desired percentage of relative humidity. Table 11 illustrates a typical set of ranges of outdoor temperatures as compared to the desired indoor percentages of relative humidity.

TABLE II

| Outdoor temperature, ° F.: | Indoor percentage relative humidity |
|---|---|
| −30 | 30 |
| 0 | 40 |
| +30 | 50 |
| +60 | 60 |

The bridge design is such that above 60° F., the control action fades out.

When the current flowing in the bridge circuit is unbalanced due to the percentage of indoor relative humidity being too low for the sensed outdoor temperature, an error signal is provided at circuit terminal 14 for controlling the amplifier which is comprised of transistors Q1 and Q2. This error signal will cause the output from transistor Q2 on conductor 28 to switch the silicon controlled rectifier CR1 in a manner to cause the relay coil K1 to be activated thereby turning on humidification equipment. When the error signal is of the opposite phase, that is, when the percentage of indoor relative humidity is greater than desired, the control signal applied to transistor Q1 will be such that the output signal from transistor Q2 will switch silicon controlled rectifier CR1 in a manner to deactivate the relay K1. Such deactivation of relay K1 can either merely eliminate a humidifier from operation, or alternatively, can be utilized by the proper connection to the contacts K1a or K1b to activate a dehumidifier.

When the outdoor temperature is determined to be for instance in the range of 50° F. to 75° F., the auxiliary circuitry shown within dashed block 30 is utilized for controlling the operation of air conditioning equipment. As mentioned above, in this temperature range the effect of the relative humidity sensor 12 on the circuit operation is negligible. By adjusting variable resistor R14, the null of the bridge can be adjusted to occur in the temperature range, for instance of approximately 50° F. to 75° F. of the outdoor temperature as determined by outdoor temperature sensor 10. Unbalance of the bridge due to changes in outdoor temperature falling within the specified range that are sufficient to cause switching of the amplifier comprised of transistors Q3 and Q4, function to control the operation of relay K2. The contacts associated with relay coil K2 can be utilized to control air conditioning equipment, and, additionally, can be used for deactivating the humidification control equipment that is controlled by relay K1.

In view of the foregoing discussion of the circuit and operation of this invention, it can be seen that the various objectives have been realized. Recognizing that various modifications will become apparent to those skilled in the art, without departing from the spirit and scope of the invention, what is desired to be protected by Letters Patent is set forth in the appended claims.

I claim:

1. Environmental control apparatus comprising:
   a. bridge means including outdoor condition responsive means in a first leg for responding to predetermined outside conditions and indoor condition responsive means in a second leg for responding to predetermined inside conditions, said bridge means further including bridge output means for providing an error signal indicative of an unbalanced condition in said bridge mean;
   b. amplifier means coupled to said bridge output means for providing a control signal in response to the presence of said error signal, and a second control signal in response to the absence of said error signal;
   c. condition determining control means coupled to said amplifier means for alternatively activating and deactivating condition determining apparatus in response to said first and second control signals;
   d. said outdoor condition responsive means including temperature sensing means and said indoor condition responsive means including relative humidity sensing means; and,
   e. indoor temperature controlling means coupled to said bridge means for providing a further error signal when the predetermined null of said bridge means and said indoor temperature controlling means is unbalanced; further amplifier means coupled to said indoor temperature controlling means for providing first temperature control signals in response to the presence of said further error signals, and second temperature control signals in response to the absence of said further error signal; and indoor temperature determining control means for alternatively activating and deactivating temperature determining apparatus in response to said first and second temperature signals.

2. Environmental control apparatus as in claim 1 wherein said indoor temperature controlling means includes temperature selection means for selecting a temperature in a predetermined range of temperatures by adjusting said null.

3. Environmental control apparatus as in claim 2 wherein said indoor condition responsive means is operative in a first predetermined range of outdoor temperatures, and said indoor temperature controlling means is operative in a second predetermined range of outdoor temperatures.

4. Environmental control apparatus comprising:
   a. bridge means including outdoor temperature responsive means in a first leg for conducting first current in amounts determined by the outdoor temperature and indoor relative humidity sensing means in a second leg for conducting second current in amounts determined by the indoor relative humidity, said bridge means including bridge output means for providing an error signal indicative of an unbalanced condition in said bridge means;
   b. transistor amplifier means coupled to said bridge output means for providing first control signals in response to the presence of said error signals and second control signals in response to the absence of said error signals;
   c. silicon controlled rectifier means having a control electrode coupled to said transistor amplifier means for conducting in a first mode in response to said first control signals and in a second mode in response to said second control signals; and
   d. relay means coupled to said silicon controlled rectifier means for operating in a first manner in response to said conduction in a first mode and operating in a second manner in response to said conduction in said second mode thereby being capable of controlling humidity controlling equipment.

5. Environmental control apparatus as in claim 4 wherein said outdoor temperature responsive means exhibits a characteristic of decreasing resistance to conduction of said first current in response to rising outdoor temperature and said indoor relative humidity sensing means exhibits a characteristic of decreasing resistance to conduction of said second current in response to rising relative humidity.

6. Environmental control apparatus as in claim 5 and further including indoor temperature control means having voltage divider means coupled to said bridge means for cooperating with said temperature responsive means for providing a further error signal when the predetermined null of said bridge means and said indoor temperature control means is unbalanced, further transistor amplifier means coupled to said voltage divider means for providing first temperature control signals in response to the presence of said further error signal and second temperature control signals in response to the absence of said further error signal; further silicon controlled rectifier means having a control electrode coupled to said further transistor amplifier means for conducting in a first mode in response to said first temperature control signals and in a second mode in response to said second temperature control signals; and relay means coupled to said further silicon controlled rectifier means for operating in a first manner in response to said conduction in a first mode and operating in a second manner in response to said conduction in said second mode, thereby being capable of controlling temperature determining equipment.